United States Patent [19]

McIntyre

[11] 3,762,512
[45] Oct. 2, 1973

[54] ELEVATOR RAIL GRAB SAFETY APPARATUS

[75] Inventor: Richard F. McIntyre, San Diego, Calif.

[73] Assignee: United States Elevator Corporation, Spring Valley, Calif.

[22] Filed: Oct. 29, 1971

[21] Appl. No.: 193,653

[52] U.S. Cl. .................................. 188/189, 187/88
[51] Int. Cl. ............................................ F16d 59/00
[58] Field of Search ...................... 187/88; 188/187, 188/188, 189

[56] References Cited
UNITED STATES PATENTS

| | | | |
|---|---|---|---|
| 1,165,583 | 12/1915 | Farmer | 188/189 |
| 3,215,231 | 11/1965 | Lodige | 188/189 |
| 3,327,811 | 6/1967 | Mastroberte | 188/188 X |
| 3,635,315 | 1/1972 | Shalders | 188/189 |

*Primary Examiner*—Duane A. Reger
*Attorney*—Neil F. Martin et al.

[57] ABSTRACT

Safety apparatus for elevators designed to exert a braking force on the guiding rail in an elevator shaft to bring an elevator car to a controlled stop when the apparatus is actuated by an overspeed sensing mechanism. The mechanism comprises two brake units on either side of the car including dual wedge shaped brake shoes, guided on wedge blocks by a ball bearing to move in a direction parallel to the rail and in a direction toward the rail, under the influence of actuator rods. The friction generated by initial contact with the rail produces an additional force, wedging the brake shoes through the bearings against the wedge block and producing an increasing force. The total force is limited, to produce a controlled deceleration of the car. A compression spring located between pivoted elongated arms controls the maximum pressure that is applied by the brake shoes. The elongated arms are pivoted on a pivot structure that permits sufficient freedom of movement to allow the brake shoes to align themselves with the rail.

6 Claims, 6 Drawing Figures

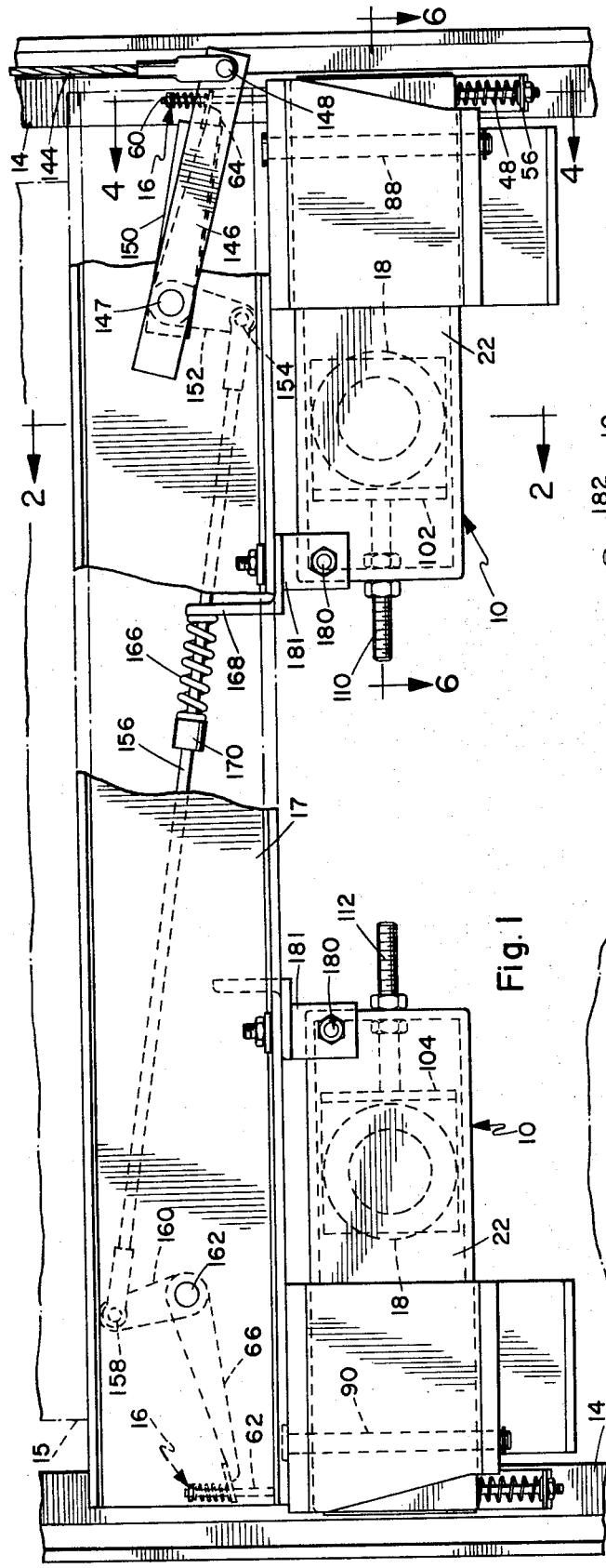
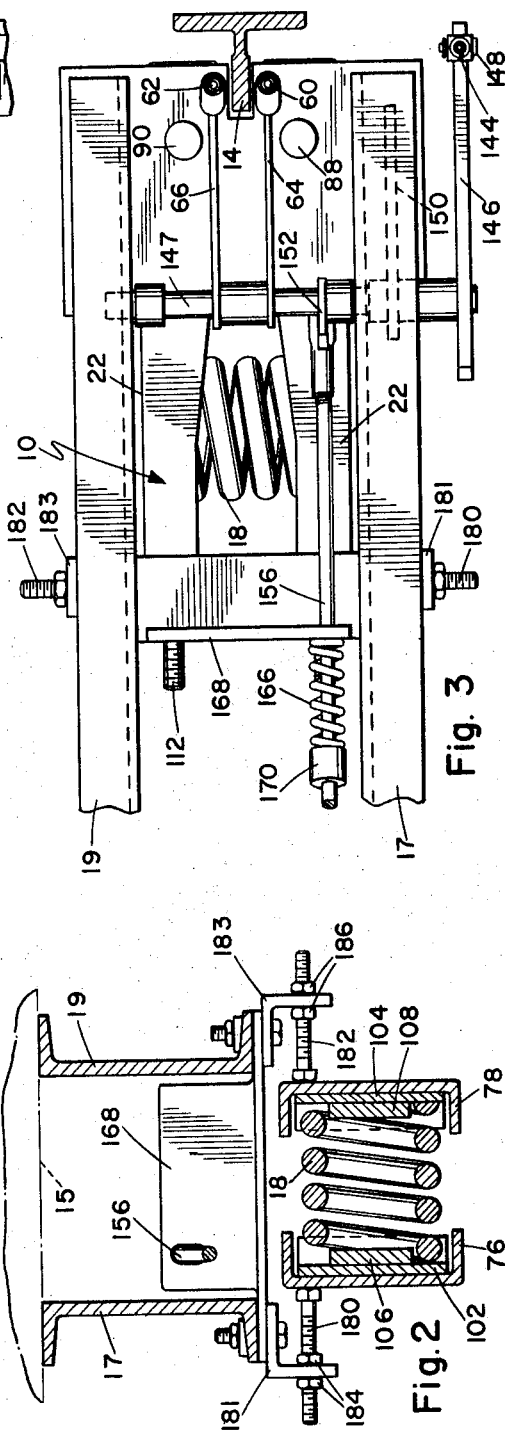
INVENTOR.
RICHARD F. McINTYRE
BY Brown & Martin
ATTORNEYS

3,762,512

ELEVATOR RAIL GRAB SAFETY APPARATUS

BACKGROUND OF THE INVENTION

The demands of safety require that every elevator have a system for bringing the car to a stop in case of an overspeed condition caused by cable failure, or other elevator system failure. These systems must reliably stop the car without excessive deceleration to avoid injury to the passengers within the car and must do so despite minor variations in alignment of the shoes with respect to the guide rails.

Prior art devices have been satisfactory for braking relatively low speed elevators, because the problems of excessive deceleration and rail alignment are less critical at low speeds. However, there has not been developed a rail braking system for elevators that is capable of bringing a high speed elevator car to a controlled stop in the minimum distance required, especially when the system is required to operate without attention over a long period of time, and be able to accommodate minor misalignment with respect to the elevator guide rail.

It would therefore be desirable if an improved elevator rail grab safety apparatus could be developed that would be usable over a wide range of elevator speeds, to bring an elevator car to a controlled stop in response to an overspeed condition, especially if the apparatus was capable of performing these functions despite non-use over considerable periods of time, and despite minor misalignment with respect to the elevator guide rails.

SUMMARY OF THE INVENTION

An exemplary embodiment of the invention incorporates brake means located adjacent one or more of the elevator rails, and mounted through wedge block means, having sloping surfaces, to cause the brake shoes of the brake shoe means to move toward the rail when caused to move along the rail. Movement along the rail is initiated by actuation means, including actuator rods controlled through a linkage. The actuator rods are moved by a speed governor, located remote from the apparatus of the invention, and connected thereto by for example, a flexible cable. Upon actuation, the actuator rods lift the brake shoe means into contact with the guiding rail. The contact produces a frictional force causing the brake shoes to move upwardly, and under the influence of the sloping surfaces inwardly, toward the rail, increasing the pressure thereon, and increasing the wedging action. The amount of force exerted on the rail increases to a maximum at which point resilient means comprising a compression spring located between two elongated members, is overridden by the wedging force and compresses, thereby limiting the maximum force exerted on the elevator rail. The elongated members carry, at one end, the compression spring, and at the other end, the wedge block means, and are pivotally mounted to the frame supporting the apparatus of the invention by pivot means. The pivot means comprises a pivot bearing including two substantially spherical balls, secured to one another along a flat area on each ball by welding or other suitable means. The spherical balls are located in a bore in the frame and are achieved in a recess in the elongated member, to provide freedom of movement for the elongated members in two axes, thereby permitting the wedge block and brake shoe means carried by the elongated members to align themselves with the rail means and thereby maintain a full frictional contact of the brake shoe means on the rail means despite minor misalignments with respect thereto.

The wedging action is self-sustaining and only the initial actuating movement is required to begin the braking cycle. The braking cycle continues without further actuation until the vehicle is brought to a complete stop. The vehicle is held in the stopped position until the mechanism is released. Release is accomplished after elevator repair by raising the elevator car to allow resilient means to pull the brake shoes along the sloping surfaces of the wedge block and out of contact with the rail. The resilient means then maintains the brake shoes out of contact with the rail until they are again actuated for braking.

The movement of the brake shoes along with wedge blocks is facilitated by a series of bearing balls mounted in a cage means. The bearing balls and cage comprise a ball bearing which produces a relatively low friction contact between the sloping surfaces of the brake shoe and wedge block, to allow the brake shoe to move freely along the sloping surfaces and respond effectively to the forces generated by contact of the brake shoe with the rail means.

It is therefore an object of the invention to provide a new and improved elevator rail grab safety apparatus.

It is another object of the invention to provide a new and improved elevator rail grab safety apparatus with increased reliability.

It is another object of the invention to provide a new and improved elevator rail grab safety apparatus that produces uniform braking action.

It is another object of the invention to provide a new and improved elevator rail grab safety apparatus that compensates for misalignments with respect to the guide rails.

It is another object of the invention to provide a new and improved elevator rail grab safety apparatus that completes an entire braking cycle with a single actuation input.

It is another object of the invention to provide a new and improved elevator rail grab safety apparatus that provides an adjustable maximum brake shoe pressure which then remains constant.

It is another object of the invention to provide a new and improved elevator rail grab safety apparatus that is usable over a wide range of elevator maximum speeds.

Other objects and many attendant advantages of the apparatus will become more apparent upon a reading of the following detailed description together with the drawings in which like reference numerals refer to like parts throughout and in which:

FIG. 1 is a side elevation view of the elevator safety rail grab apparatus of the invention.

FIG. 2 is a sectional view taken on lines 2—2 of FIG. 1.

FIG. 3 is a partial top plan view of the apparatus.

Figure 4:
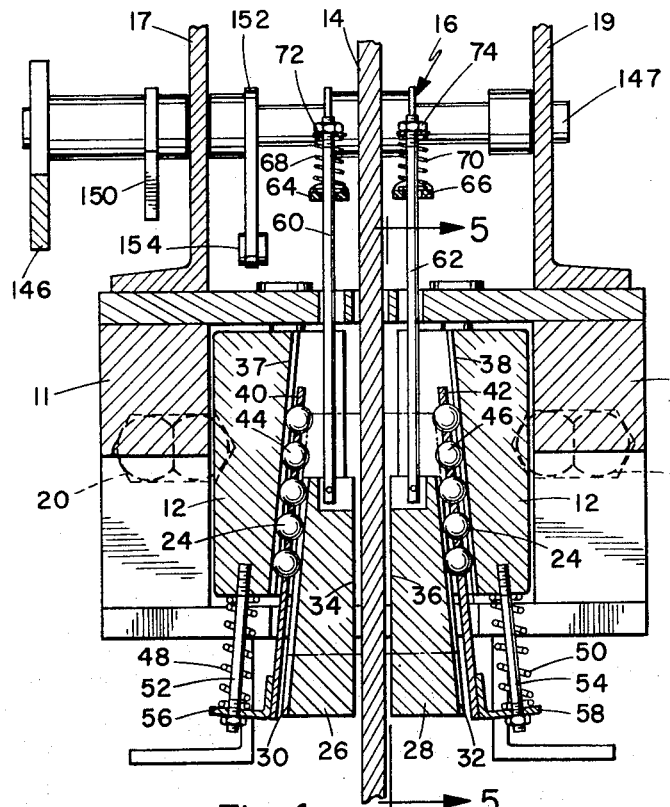
FIG. 4 is a sectional view taken on lines 4—4 of FIG. 1.
Figure 5:
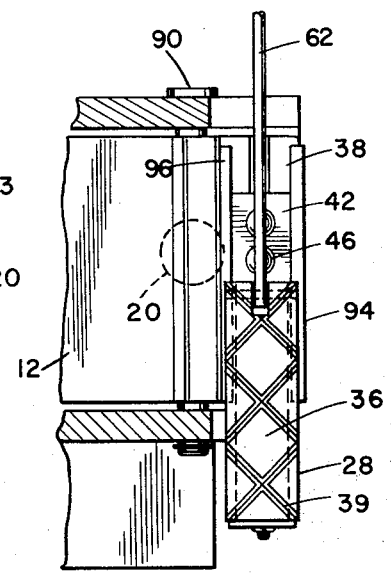
FIG. 5 is a sectional view taken on lines 5—5 of FIG. 4.

Referring now to the drawings, there is illustrated a brake means 10 in association with wedge block means 12 and spaced from a rail 14. The brake means are supported and controlled by actuator means 16. The wedge block means forms a portion of the elongated members 22 that also house a compression spring 18. The elongated member is pivoted on pivot means between the end containing the wedge block means and the end containing the compression spring. The pivot means 20 is located in the frames 11 and 13 and receives in a recess in the elongated member for pivotal movement of the member in two axes.

Referring now to FIG. 4, the brake means is illustrated as comprising two brakes or brake shoes 26 and 28. The shoe 26 has a sloping surface 30 that engages the bearing means 24, and a braking surface 34 that engages the track 14. Similarly, the brake 28 has a sloping surface 32 and a braking surface 36. The wedge block means has a wedge shaped configuration formed by two sloping surfaces 37 and 38 that are approximately parallel to, and spaced from, the sloping surfaces of the brake shoes. Relative movement between the brake shoes and wedge block means is facilitated by the bearings 24 that incorporate ball cages 40 and 42 carrying a plurality of balls 44 and 46. The cage is free to move along the surface of the wedge block means but is resiliently biased to return to its initial position by springs 48 and 50, supported on bolts 52 and 54 received in the wedge block means. The bolts mount brackets 56 and 58 for connection to the cage.

The actuator means 16 comprises actuator rods 60 and 62 pivotally attached to shoes 26 and 28 and supported by springs 68 and 70 seated on levers 64 and 66. The spring force is transmitted to the actuator rods through washer-nut combination 72 and 74. The resilient limiting means comprises a compression spring 18 located between the channel members 76 and 78 of the elongated members 22. The springs are located by centering means 106 and 108 and supported for lateral movement on brackets 102 and 104. The brackets are retained in a predetermined lateral position by the bolts 110 and 112. These bolts are carried in the elongated members and bolt 110 is secured in position by nuts 114 and 116 whereas bolt 112 is secured in position by nuts 118 and 120.

Figure 6:
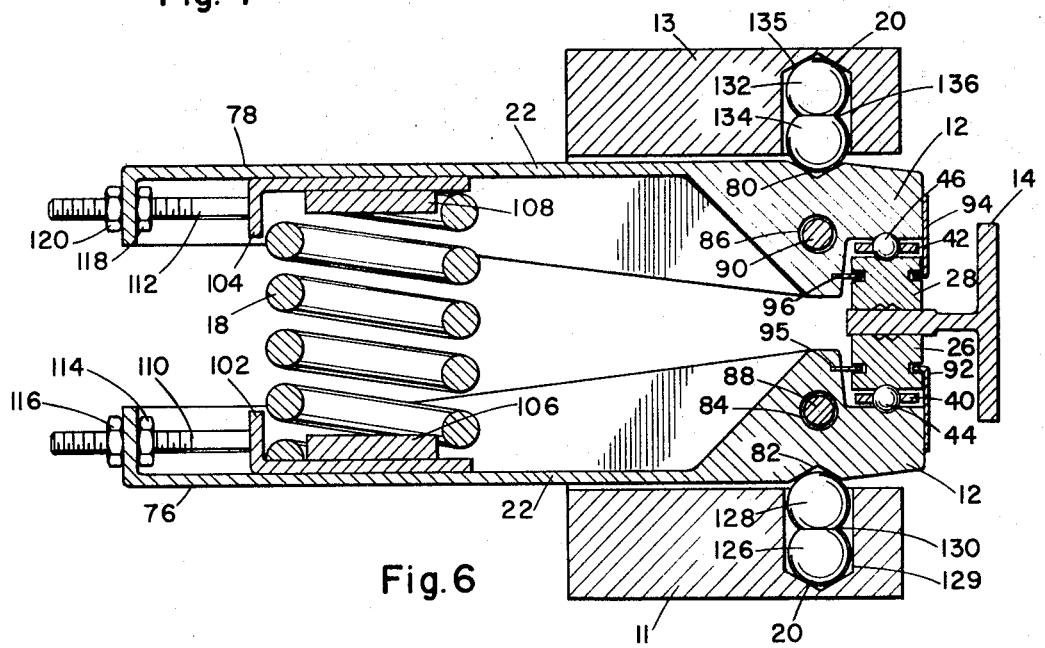
FIG. 6 is a sectional view taken on lines 6—6 of FIG. 1.

Referring now particularly to FIG. 6, the end of the elongated member supporting the wedge block means is illustrated to include a pair of bores 84 and 86 receiving loosely fitting pivot pins 88 and 90. The elongated member also supports a plurality of brake shoe retainer guides. Brake 28 is retained and guided by retainer guides 94 and 96, and brake 26 is constrained and guided by retainer guides 92 and 95.

The pivot means 20 utilizes substantially spherical balls in pairs, secured along flat surfaces. Bearing balls 126 and 128 are secured along a plane 130 and are received within a bore 129 in frame member 11. Ball 128 protrudes beyond the bore and is received within a recess 82 in an elongated member 22. The opposing bearing is comprised of bearing balls 132 and 134 secured along plane 136 and received within bore 135 in frame member 13. Ball 132 protrudes beyond the bore into a recess 80 in the second elongated member.

Referring now to FIG. 2, there is illustrated the centering structure utilized to position the extreme ends of the elongated members. The structure includes centering bolt 180 mounted in a bracket 181 secured to channel member 17. The position of centering bolt 180 is determined and locked by a pair of nuts 184. The opposing center bolt 182 is supported from a bracket 183 carried on channel member 19 and is retained in position by a pair of nuts 186.

Referring now to FIG. 1, the apparatus of the invention is illustrated an including two braking mechanisms 10 substantially as previously described, located on opposite sides of the underside of a car 15. The car structure includes transverse channel members of which channel member 17 is visible. The mechanism of the invention is actuated and controlled by a governor mechanism located remote from the elevator car, for example, in the machinery room at the top of the elevator shaft. A cable 144 transmits the force from the governor to the rail grab apparatus of the invention. The cable 144 is secured to a lever 146 through pivot 148. The lever 146 is connected to a cross shaft 147 and all of the operations of the invention are controlled by the rotation of this cross shaft. The rotation of the cross shaft 147 occasioned by force on cable 144 is transferred to the first brake unit 10 by the previously described levers 64 and 66 secured to pivot bar 147. Also secured to cross shaft 147 is a bell crank 152 that transfers forces through pivot 154 and transfer rod 156 to a mechanism on the opposite side of the car for actuating the second brake unit 10. The transfer rod is connected to a bell crank 160 by pivot 158 and, through a cross shaft 162 to a second actuator means 16. The second brake unit of the invention is in all respects identical to the first brake unit. A spring 166 located between the pivoted ends of the transfer bar 156 bears against a shoulder on bracket 168 on one end, and against a shoulder on a fitting 170 secured to the transfer bar and maintains the mechanism in a non-braking position until it is activated. A stop arm 150, fixed on cross shaft 147, limits motion of the actuating mechanism by striking the top flange of channel member 17.

OPERATION

In an elevator installation, the apparatus of the invention is utilized by securing it to the bottom of an elevator car and connecting the cable leading to the governor mechanism. During normal operation of the elevator, the unit would not do any braking and therefore the springs 68 and 70 would be fully extended with the actuator rods suspending the brake shoes in position. The guides 94 and 96, 92 and 95 would hold the shoe out of contact with the rail. This condition is illustrated in FIG. 4. The guides utilized with the brake shoes ensure that there is good alignment between the braking surface and the rail so that when contact is made it is over a large area and a uniform and effective braking action will result.

When braking action is initiated, the rotation of the cross shaft 147 caused by the cable 144 causes the actuator levers 64 and 66 as well as the corresponding levers in the second brake unit to raise the actuator bars through the force of the springs and cause the brake shoes to move along the sloping surfaces of the wedge block means. Movement along these surfaces is relatively friction free due to the utilization of bearings in a movable cage, and therefore there is no misalignment of the brake shoes during this movement. The sloping surfaces cause the brake shoes to move toward the rails as well as upwardly during the actuation process, and eventually the braking surfaces 34 and 36 contact the rail, causing the frictional force of the rail moving past the shoe to draw them further upwardly, and therefore to force them toward the rail with increasing force.

This jamming action produces high braking force immediately and the resilient limiting means 18 therefore is necessary to limit the total force to that desired for slowing the car to a stop in a predetermined distance while avoiding excessive deceleration. The precise deceleration effect for a particular installation compensating for the variables of car weight and speed is set through the adjustment of the resilient limiting means. During the braking action the brake shoes are retained in alignment by the supporting structure and the pivot means allows for movement of the elongated members to compensate for minor variations in the alignment and position of the rail. The shoes are to maintain good contact over substantially the entire braking area and therefore produce a uniform and predictable braking action. Any accumulation of scale or other foreign material on the rail will be removed by the slots 39 in the brake shoe to further ensure the uniformity of braking action. The operation of the second brake unit is substantially identical to the first and is initiated at substantially the same time through the movement of the transfer bar 156 secured through bell crank 152 on the cross shaft 147.

After an emergency stop has been completed, the car will be held in position by the wedging action, under the influence of the weight of the car, and will not move until the elevator apparatus has been repaired and it is possible to raise the car, by the elevator machinery, a sufficient distance to allow the springs 50 and 48 on the bearing cages and the springs 68 and 70 on the actuator rods, to move the brake shoes out of contact with the rail and in position for successive emergency stops as necessary.

Having described my invention, I now claim.

1. Rail grab safety apparatus for exerting a braking force on a rail to bring a vehicle to a stop and hold the vehicle under the influence of the vehicle's weight comprising:
   at least one brake means for mounting on a vehicle in proximity to a rail;
   said brake means comprising:
   at least one brake shoe means for contacting said rail for producing a braking action and for inducing a movement of said brake shoe means in a direction substantially parallel to said rail;
   wedge block means for guiding said brake shoe means toward said rail in response to the movement of said brake shoe means parallel to said rail;
   actuator means for initiating contact between said brake shoe means and said rail;
   pivot means for transmitting the loads from said brake shoe means to said vehicle while allowing freedom of movement of said brake shoe means in two axes of rotation about said pivot means;
   said pivot means comprising a pivot bearing mounted in a frame;
   said pivot bearing supporting said elongated members for pivotal movement;
   said resilient limiting means comprising spaced apart elongated members and a spring located between and contacting both of said members.

2. Rail grab safety apparatus for exerting a braking force on a rail to bring a vehicle to a stop and hold the vehicle under the influence of the vehicle's weight comprising:
   at least one brake means for mounting on a vehicle in proximity to a rail;
   said brake means comprising;
   at least one brake shoe means for contacting said rail and producing a braking action, and for inducing a movement of said brake shoe means in a direction substantially parallel to said rail;
   wedge-block means for guiding said brake shoe means toward said rail in response to the movement of said brake shoe means parallel to said rail;
   actuator means for initiating contact between said brake shoe means and said rail;
   resilient limiting means for limiting the maximum force of said brake shoe means on said rail;
   pivot means for transmitting the loads from said brake shoe means to said vehicle while allowing freedom of movement of said brake shoe means in two axes of rotation about said pivot means; and
   said pivot means comprises spaced partial, spherical surfaces on a pivot link member cooperating with spherical seats in said frame means and said elongated members.

3. Apparatus according to claim 2 wherein:
   said wedge block means comprises two sloping surfaces on said elongated members;
   said sloping surfaces being located on the opposite side of said pivot bearing from said resilient limiting means;
   and said sloping surfaces facing one another.

4. Apparatus according to claim 3 including:
   bearing balls in cage means;
   said balls contacting said sloping surfaces and said brake shoe means;
   and said cage means for limited resiliently biased movement along said sloping surfaces.

5. Apparatus according to claim 4 wherein:
   said actuator means comprises actuator rods secured to said brake shoes;
   and said actuator rods being connected through resilient means to means for producing a force in response to an overspeed condition.

6. Apparatus according to claim 1 wherein:
   said spring is spaced away from said pivot means a distance in excess of the distance between said pivot means and said brake shoe means.

* * * * *